June 13, 1950   R. H. DRAEGER ET AL   2,510,965
MANUALLY OPERATED PHOTOFLUOROGRAPHIC CAMERA Filed Aug. 29, 1945   3 Sheets-Sheet 1

Rupert H. Draeger   Inventor
Harold F. A. Long

By Ralph L. Chappell
Attorney

June 13, 1950

R. H. DRAEGER ET AL 2,510,965

MANUALLY OPERATED PHOTOFLUOROGRAPHIC CAMERA

Filed Aug. 29, 1945

Rupert H. Draeger, Inventor
Harold F. A. Long

By Ralph L. Chappell
Attorney

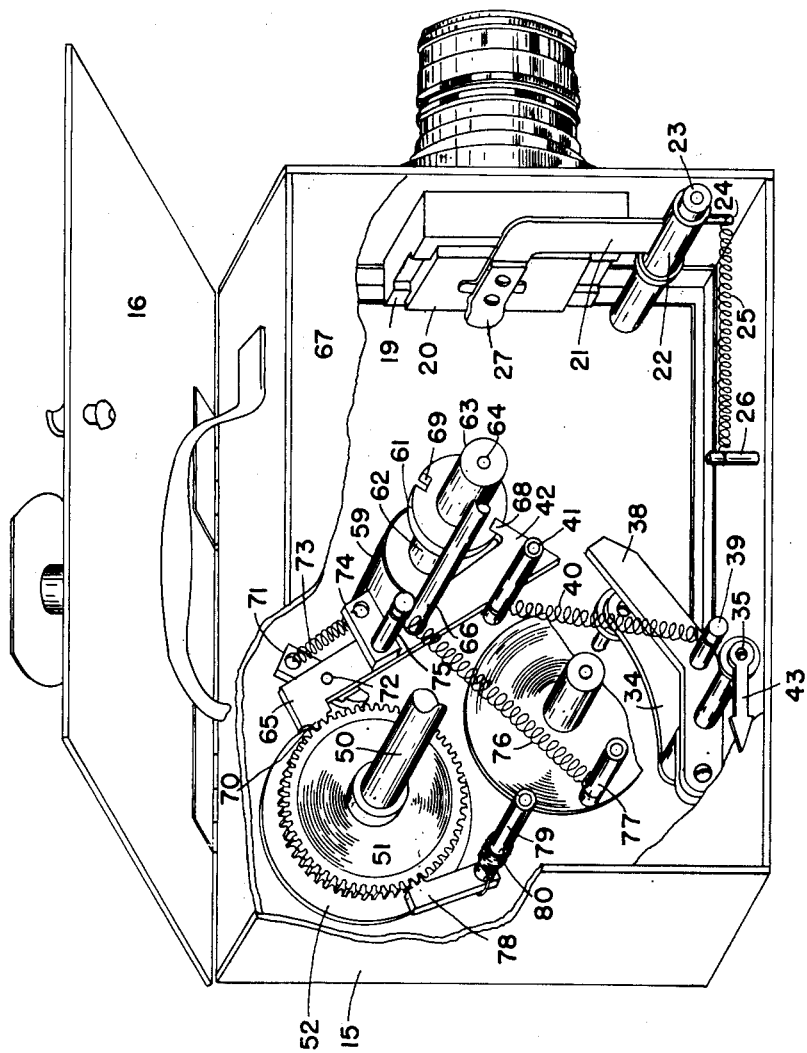

Patented June 13, 1950

2,510,965

UNITED STATES PATENT OFFICE 2,510,965

MANUALLY OPERATED PHOTOFLUOROGRAPHIC CAMERA

Rupert H. Draeger and Harold F. A. Long,
United States Navy

Application August 29, 1945, Serial No. 613,402

1 Claim. (Cl. 95—31)

(Granted under the act of March 3, 1883, as amended April 30, 1928; 370 O. G. 757)

This invention relates to a photofluorographic camera more particularly to a manually operated camera especially adapted to microphotography or photofluorography.

Photofluorography may be defined as the art of photography of the X-ray fluorescent screen. Radiography employs a photographic film of substantially the same size as the object being X-rayed. For example, radiography of the chest ordinarily employs a 14 x 17 inch X-ray film. It is thus apparent that the film cost in radiography is directly proportional to the size of the object being X-rayed. Furthermore, because of this large size, the cost of film processing is high and filing space is excessive.

It is an object of this invention to provide a photofluorographic camera utilizing miniature film, thus reducing the film cost heretofore incident to clinical and industrial X-ray examinations.

Another object of the invention is to provide a simple, compact, manually operated camera which is readily detachable from a photofluorographic X-ray unit for reloading.

A further object is to devise a portable compact manually operable photofluorographic camera which may employ a sufficient quantity of film to make frequent reloading unnecessary.

It will be appreciated that the photography of the X-ray fluorescent screen by a miniature camera will result in a marked saving of film. For example, whereas the cost of a 14 x 17 inch X-ray film is of the order of 60 cents, the cost of a 35 mm. photofluorographic film to make the equivalent photograph is only about 1 cent. The filing space required for the processed films is, of course, directly proportional to their relative sizes.

While there are a number of obvious advantages to photofluorography it does present certain inherent difficulties. The low light intensity of the fluorescent screen requires a correspondingly fast photographic lens and an appreciably longer X-ray exposure to obtain a satisfactory photographic image. There is also some inherent loss of detail involved in forming an image of a fluorescent screen upon the photographic negative.

It has been suggested heretofore to utilize miniature cameras for photofluorography. However, since such cameras normally hold but a limited supply of film considerable attention and frequent reloading would be required.

The fundamental principle of the invention involves the use of a simple manually operated miniature camera especially designed to successively photograph images of the X-ray fluorescent screen.

The fundamental principle of the invention and the novel features of construction and design of the camera will be more readily appreciated and evaluated from the consideration of a preferred physical embodiment such as is shown in the accompanying drawings in which:

Fig. 3 is a perspective view of the camera as seen from the rear with the back plate cut away.

Figure 1:
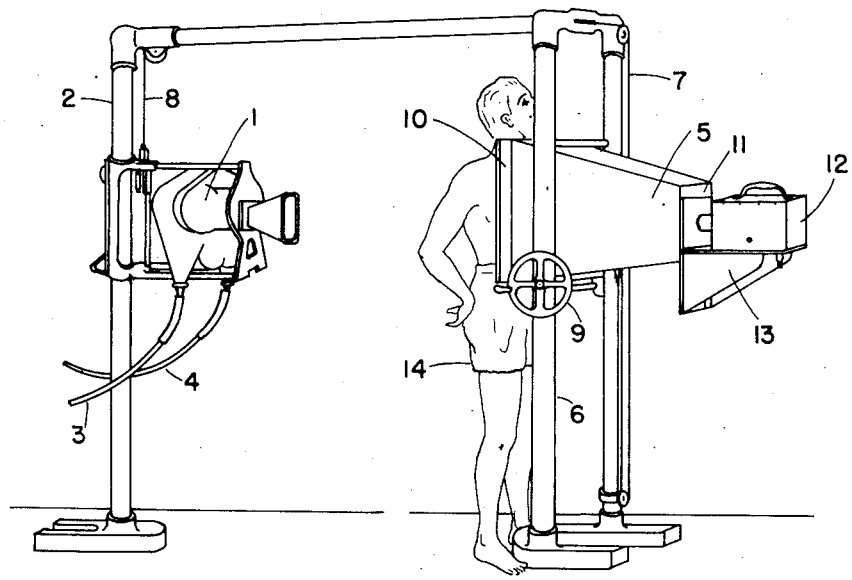
Fig. 1 is a perspective view of the photofluorographic unit

As will be seen in Fig. 1, the photofluorographic unit comprises essentially an X-ray tube mounted for vertically adjustable movement upon the standard 2. The tube 1 is electrically connected by the cables 3 and 4 in the usual manner to the X-ray transformer and control stand (not shown).

A light-tight truncated box 5 is mounted for vertically adjustable movement upon the standard 6. The movement of the X-ray tube 1 and the cone 5 are synchronized by means of the cables 7 and 8. This movement is effected by means of the hand wheel 9, mounted for vertical movement with the cone 5. The cone 5 is associated at its larger end with an X-ray fluorescent screen 10 and at its smaller end with a support plate 11 which is adapted to carry the camera 12. The plate 11 is formed with an aperture having a light-tight bushing to receive the lens of camera 12. The camera, as will be seen, rests upon the mounting bracket 13 attached to support plate 11. The patient or subject 14 is shown in a position before the fluorescent screen in the usual manner for radiography.

The photofluorographic camera 12 comprises essentially a light-tight case or compartment 15 of any suitable construction or design which is closed by the hinged door 16. The camera is provided with the photographic lens 17 which is adapted to focus on film 18 in the film gate 19. The film 18 is retained in the film gate by means of the plate 20 and is supported by the movable arm 21. The arm 21 is integrally attached to the collar 22 which latter is rotatably mounted upon the shaft 23. The collar 22 is provided with a pin 24 connected to one end of the spring 25. As shown, the other end of the tension spring is attached to the spring post 26. As will be observed, the tension spring 25 operates through arm 21 to hold the retaining plate 20 and indirectly, the film 18 in its proper position in the film gate. As will be seen, the extension 27 provides a means for readily opening the film gate for insertion of the film.

A film roll 29 with a center spool 30 is rotatably mounted upon the shaft 31, and is supported by magazine half-spool 32. The door 16 is provided with a plate 33 which opposes half-spool 32 and serves to retain the film roll 29 upon the magazine spool when the camera door is in closed position.

One of the several improved features of the present invention is the provision of means for indicating the quantity of film remaining on magazine film roll 29. This unit comprises essentially the curved arm 34 which is pivoted at one end for rotation upon the shaft 35. The other end of the arm 34 is provided with the idler roller 36 and extension boss 37 by means of which the arm 34 is withdrawn so as to permit the insertion of a film roll on shaft 31. The curved arm 34 is formed with an integral extension 38 provided with a spring post 39 to which is attached one end of spring 40. The other end of the spring 40 is connected to a spring post 41 which latter acts as a stop for the lever 42.

The shaft 35 which carries the arm 34 is provided with an indicator pointer 43. Since this pointer is attached to the shaft 35 and moves with the arm 34, it serves to visually indicate the quantity of film remaining on the magazine film roll 29. As shown, the pointer 43 is located outside of the case for easy and ready inspection. A dial face may be associated with the pointer to indicate the quantity of film remaining on the spool.

The take-up mechanism comprises the shaft 50, one end of which is journaled in a bearing attached to the side wall of the camera opposite the door 16. The shaft 50 extends through this side wall and on the outside is provided with a knurled knob (not shown) whereby the shaft 50 may be manually operated. The shaft 50 has keyed thereon a spur gear 51 and an adjacent take-up half-spool plate 52. The shaft 50 extends beyond the plate 52 and provides the shaft extension 53 upon which the take-up film spool 54 is mounted. The end of shaft 53 is threaded to receive the plate 55. This plate is furnished on one side with a screw for engaging the corresponding threads on the shaft 53 and on the opposite side with an integral knurled knob 55' whereby the plate may be readily attached or removed. As will be appreciated, the plate 55 serves to hold the film magazine roll 54 in position upon the film take-up shaft 53. The film take-up spool 54 is provided with apertures 56 adapted to receive pins (not shown) attached to the plate 52.

Figure 2:
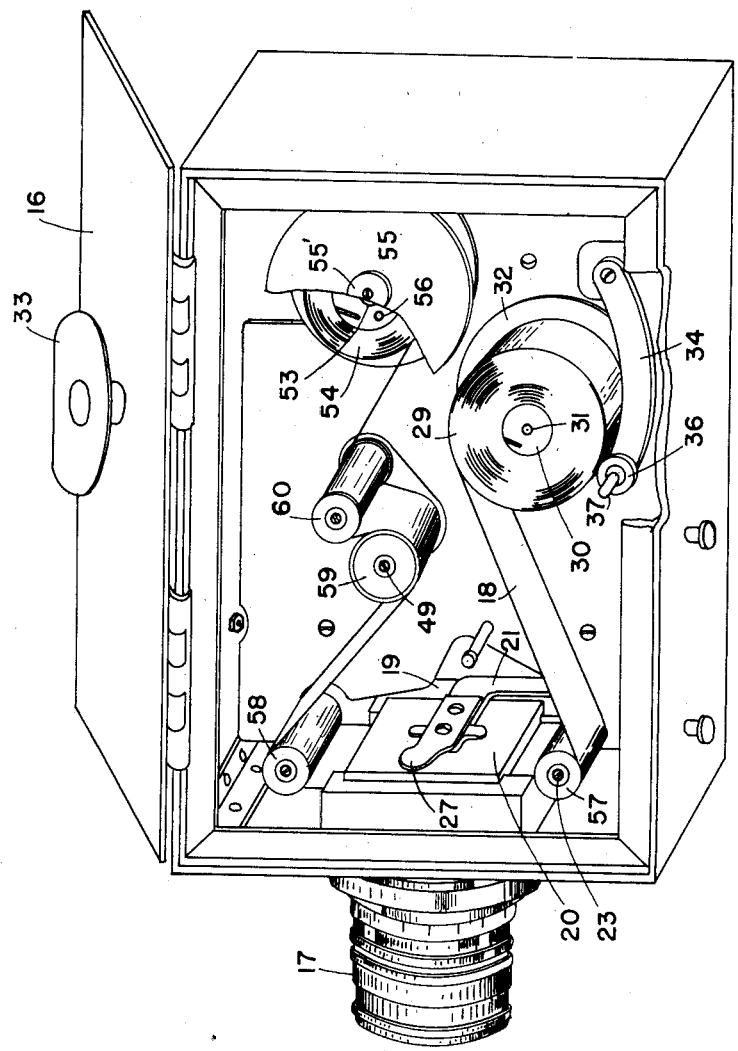
Fig. 2 is a perspective view of the interior of the camera as seen from the front.

As will be seen from Fig. 2, film from the magazine spool 29 passes over idler roller 57 which is freely rotatable upon shaft 23. The film passes through the film gate and over the opposite idler roller 58 and then over the pressure roller 59 and associated idler roller 60 to the take-up spool 54. The pressure roller 59, as shown in Fig. 3, is attached to the disc 61 by means of the hollow extension 62. The pressure roller 59, disc 61 and connecting extension 62 are freely rotatable upon the shaft 49. Shaft 49 is attached to the boss 63 having a threaded portion 64 by which means it may be attached to the camera back plate by a screw (not shown).

The camera is provided with an improved simplified film advancing mechanism. This comprises the association of the spur gear 51, the notched disc 61, and the lever 65. The lever 65 is attached to the shaft 66 and is adapted to be rotated therewith. The shaft 66 is supported in a bearing (not shown) attached to the back plate 67 of the camera and extends through this plate to the outside of the camera and terminates in an attached knob (not shown) whereby it may be manually rotated. The lever 65 is formed at one end with the detent 68 adapted to engage the notches 69 of disc 61. The opposite end of the lever is provided with rack teeth 70 adapted to engage the teeth of spur gear 51. There is also provided at this end of the lever the pawl 71 mounted for pivotal movement upon the pin 72. One end of the pawl is attached to the tension spring 73, the other end of which is attached to the plate 74 fixed to the lever 65. This plate carries the spring post 75 to which one end of tension spring 76 is attached. The other end of this spring is attached to the spring post 77 which is secured to the back plate 67. Counterclockwise rotation of spur gear 51 is prevented by means of pawl 78 which is mounted for rotation upon a support 79. The coil spring 80 serves to press the rack teeth of the pawl into contact with spur gear 51.

The operation of the simplified film advancing mechanism will be appreciated from the foregoing description. Manual rotation of the extension knob attached to shaft 66 causes pivotal movement of lever 65 and disengagement of detent 68 from disc 61 and rack teeth 70 from spur gear 51. As will be noted, as the lever is rotated the spring pressed pawl 71 will assume a perpendicular position with relation to the lever 65 and prevent the reengagement of the rack teeth 70 or detent 68. Clockwise rotation of shaft 50 effects rotation of the spur gear 51 and associated take-up spool 54 to move an additional unexposed portion of film into the film gate. Rotation of spur gear 51 rotates pawl 71 disengaging it from the spur gear 51 allowing lever 65 to rotate until the detent 68 rests upon the periphery of the disc 61 and finally engages the opposite notch 69, thus insuring the proper amount of film being advanced into the film gate. As detent 68 engages notch 69 rack teeth 70 will likewise reengage spur gear 51, thus locking the film advancing mechanism. As will be appreciated, the film advancing cycle thus involves the successive clockwise rotation of the shafts 66 and 50.

Another improved feature of the invention is the provision of a mechanical interlock mechanism whereby the film advancing mechanism is rendered inoperable when the film magazine supply is almost exhausted. This feature is accomplished by the extension 38 of the film indicator mechanism. As the film magazine roll diminishes in diameter the arm 38 and idler roller 36 are rotated about shaft 35. As will be seen, when the arm 38 rotates to a predetermined position below the end of lever 65 pivotal movement of said lever is prevented thereby locking the entire film advancing mechanism and indicating to the operator that the film supply needs to be replenished.

It will thus be seen that the photofluorographic camera herein described is as simple as it is effective. The unit comprises essentially only a minimum of moving parts to control the advancement of film in the film gate and to provide an interlocking mechanism when the camera is out of film. The novel association of the lever 65 with the disc 61 insures the advancement of a predetermined quantity of film in the film gate regardless of the amount of film on either the magazine or the take-up spool. The depletion of film is simply and effectively indicated by pointer 43 with a simplified mechanism.

It is apparent therefore that eminent simplicity of mechanism is insured by the performance of a plurality of functions by the several mechanical elements involved.

It is apparent that the camera structure is susceptible of considerable modification for the purpose of accomplishing any desired supplemental functions. For example, a shutter mechanism may be incorporated and the camera employed for microphotography or other uses.

While a preferred embodiment of the invention has been shown and described it will be understood that this is given to illustrate the particular principles involved and not as limiting the useful scope of the invention to the chosen illustrative embodiment.

The invention described herein may be manufactured and used by or for the Government of the United States of America for governmental purposes without the payment of any royalties thereon or therefor.

We claim:

A camera comprising a housing, a film gate within the housing, a film magazine roll, a film take-up roll comprising a shaft having a ratchet mounted thereon, said shaft projecting through the housing and provided with a manually operable knob, a pressure roller interposed between the take-up spool and the film gate, said pressure roller being provided with a notched disc, a lever pivotally mounted upon a shaft, said shaft extending through the housing and provided with a manually operable knob, one end of the lever being provided with ratchet teeth for engagement with the ratchet of said take-up mechanism and the other end of the lever being formed with a dog adapted to engage the notches in the disc of the pressure roller, a spring pressed pawl pivotally mounted on an end of the lever adjacent to said ratchet and adapted to retain said lever in a disengaged position when said lever has been manually disengaged, said pawl being adapted to being released when the ratchet of the take-up mechanism is rotated and a spring pressed pawl adapted to prevent counterclockwise rotation of the ratchet of the take-up mechanism.

RUPERT H. DRAEGER.
HAROLD F. A. LONG.

REFERENCES CITED

The following references are of record in the file of this patent:

UNITED STATES PATENTS

| Number | Name | Date |
| --- | --- | --- |
| 1,744,773 | Labrely | Jan. 28, 1930 |
| 1,806,763 | McCarthy | May 26, 1931 |
| 1,897,903 | Hopkins | Feb. 14, 1933 |
| 1,957,889 | Hopkins et al. | May 8, 1934 |
| 1,974,842 | Black | Sept. 24, 1934 |
| 2,063,331 | Nagel | Dec. 8, 1936 |
| 2,090,017 | Young, Jr. | Aug. 17, 1937 |
| 2,131,926 | Weiblen et al. | Oct. 4, 1938 |
| 2,139,759 | Lindenberg | Dec. 13, 1938 |
| 2,150,696 | Nelson | Mar. 14, 1939 |
| 2,351,999 | Nerwin | June 20, 1944 |
| 2,358,327 | Harris | Sept. 19, 1944 |

FOREIGN PATENTS

| Number | Country | Date |
| --- | --- | --- |
| 591,215 | France | Apr. 4, 1925 |
| 563,304 | Great Britain | Aug. 9, 1944 |